US006895238B2

(12) United States Patent
Newell et al.

(10) Patent No.: US 6,895,238 B2
(45) Date of Patent: *May 17, 2005

(54) METHOD FOR PROVIDING ENTERTAINMENT TO A PORTABLE DEVICE

(75) Inventors: Michael A. Newell, Williams Bay, WI (US); Robert F. D'Avello, Lake Zurich, IL (US); Scott B. Davis, Walworth, WI (US)

(73) Assignee: Motorola, Inc., Schaumburg, IL (US)

( * ) Notice: Subject to any disclaimer, the term of this patent is extended or adjusted under 35 U.S.C. 154(b) by 823 days.

This patent is subject to a terminal disclaimer.

(21) Appl. No.: 09/821,915

(22) Filed: Mar. 30, 2001

(65) Prior Publication Data

US 2002/0142759 A1 Oct. 3, 2002

(51) Int. Cl.⁷ ............................................. H04M 3/00
(52) U.S. Cl. ....................... 455/414.2; 455/414.3; 455/456.3; 455/457; 455/306; 340/988; 463/40
(58) Field of Search ...................... 455/414.1, 414.2, 455/414.3, 400–419, 456.1, 456.2, 456.3, 456.6, 457, 440, 517, 566, 99, 404.2, 422.1, 412.1, 3.02–3.06, 463, 466, 422, 312, 899; 370/310; 463/40–42, 25–29; 340/539.13, 461, 945.2, 988–994, 995.1–995.28; 701/207–208, 200, 211–213

(56) References Cited

U.S. PATENT DOCUMENTS

| | | | | |
|---|---|---|---|---|
| 4,162,792 A | * | 7/1979 | Chang et al. ............... 463/4 |
| 5,056,798 A | * | 10/1991 | Wehrley ................. 273/460 |
| 5,508,731 A | | 4/1996 | Kohorn |
| 5,664,948 A | * | 9/1997 | Dimitriadis et al. |
| 5,697,844 A | | 12/1997 | Von Kohorn |
| 5,710,884 A | * | 1/1998 | Dedrick |
| 5,752,186 A | * | 5/1998 | Malackowski et al. |
| 5,855,008 A | * | 12/1998 | Goldhaber et al. |
| 5,983,094 A | * | 11/1999 | Altschul et al. |
| 5,984,311 A | * | 11/1999 | Stefanik et al. ............ 273/459 |
| 5,990,928 A | | 11/1999 | Sklar et al. |
| 5,999,808 A | | 12/1999 | LaDue |
| 6,023,241 A | * | 2/2000 | Clapper |
| 6,026,375 A | * | 2/2000 | Hall et al. |
| 6,080,063 A | * | 6/2000 | Khosla ..................... 463/42 |
| 6,091,956 A | | 7/2000 | Hollenberg |
| 6,148,253 A | * | 11/2000 | Taguchi et al. ............ 701/48 |
| 6,202,008 B1 | | 3/2001 | Beckert et al. |
| 6,278,938 B1 | * | 8/2001 | Alumbaugh .............. 701/208 |
| 6,285,868 B1 | * | 9/2001 | LaDue ..................... 455/410 |
| 6,320,495 B1 | * | 11/2001 | Sporgis ................. 340/323 R |
| 6,374,179 B1 | | 4/2002 | Smith et al. |
| 6,401,033 B1 | * | 6/2002 | Paulauskas et al. ........ 701/207 |
| 6,518,967 B1 | * | 2/2003 | Iwasaki ................... 345/426 |
| 6,594,352 B1 | * | 7/2003 | Smith ................. 379/114.01 |
| 6,603,835 B2 | * | 8/2003 | Engelke et al. ............ 379/52 |
| 6,738,468 B1 | * | 5/2004 | Gilbert ................. 379/218.01 |

FOREIGN PATENT DOCUMENTS

| | | | | |
|---|---|---|---|---|
| WO | WO 98/47295 | 10/1998 | | |
| WO | WO 200029083 A1 | * | 5/2000 | .......... A63F/09/22 |
| WO | WO 200105476 A1 | * | 1/2001 | .......... A63F/13/12 |

OTHER PUBLICATIONS

Infogate PRNewswire Source: Sprint PCS, Jan. 30, 2001, Sprint and Unplugged Games, Inc. to Launch New Wireless Games On The Spring PCS Wireless Web 2 pages.

* cited by examiner

Primary Examiner—Pablo N. Tran
(74) Attorney, Agent, or Firm—Brian M. Mancini (57) ABSTRACT

A unique method for providing entertainment to a portable device, such as a wireless communication device, is disclosed. The method includes steps of receiving location information related to said wireless communication device; providing challenges associated with a game to a user of a wireless communication; providing rewards in response to answers based upon the location of said wireless communication device. The method finds particular application in vehicles having telematics communications products.

20 Claims, 7 Drawing Sheets

METHOD FOR PROVIDING ENTERTAINMENT TO A PORTABLE DEVICE

FIELD OF THE INVENTION

The present invention is generally related to wireless communication systems, and more particularly to a method for providing entertainment to a communication device in a wireless communication system.

BACKGROUND OF THE INVENTION

As vehicles such as automobiles have evolved, entertainment features have been added to make transportation more enjoyable. In the early days of the automobile for example, AM radios were added to provide entertainment for long distance drives. Such audio systems have improved to accommodate removable media devices, such as cassettes or CDs. In more advanced systems, a display has been incorporated in the vehicle to accommodate even more advanced information, such as driving routes provided by a navigation systems.

As the wireless communication industry continues to develop and wireless communication systems have greater bandwidth, additional opportunities to provide services have become available. One such opportunity includes entertainment systems that enable playing of games. While passengers in a vehicle can always play conventional handheld games currently on the market, such games provide no different experience than when outside of the vehicle. Because of the unique situation of the mobility of a vehicle and the status of a number of vehicle systems, there is an opportunity to provide games having inputs based upon the location of the vehicle and the status of vehicle systems. There is also an opportunity to generate revenue or provide advertisement opportunities based on the location and status of the vehicle.

Accordingly, there is a need for a method for providing entertainment to a vehicle that enables advertisers to provide information and/or advertisements to a vehicle.

DESCRIPTION OF THE PREFERRED EMBODIMENTS

The present disclosure relates to a method to safely involve the driver and/or occupants of a vehicle in the journey, while keeping their attention and providing product information. The method includes having one or more players hunt for specific items during a journey. The items can be landmarks, unique signs, buildings, specific businesses, or any other detectable item, such as songs on specific radio stations. The games and/or list of items could be provided to the player by any number of methods, such as calling a toll free number, accessing a particular web site, by mail, or directly downloaded to a wireless communication device. The game, preferably incorporated in software, can be given away by participating sponsors, or sold to players.

The control information is entered into the game unit, and the fun begins and does nothing but grow as the journey proceeds. As the player observes an item, he can record that item. Alternatively, an automatic registration of the score occurs when the player comes within a predetermined distance to the item, and preferably for a predetermined amount of time. The distance requirement could be based on the ability to read the information contained at the site. The information could be educational, product information, today's specials, etc. The time requirement could be based on whether the player had time to digest the information or product presented. The points gained by the player could be influenced by the time of day (e.g. fewer points for a 9:00 A.M. hotel spotting than a 5:00 P.M. hotel spotting), amount of time spent (e.g. 8 hours at the hotel worth more than 2 minutes driving through the parking lot). Multiple players within a vehicle, or players in multiple vehicles could all play against each other. The winner could be based on a points per mile basis, total points, or points per minute, or some other consideration. Further, points could be deducted for speeding, crossing certain bridges, or going near "bad" landmarks (e.g., competitors not sponsoring the game).

An additional feature of the present disclosure includes the use of coupons and/or discounts to sponsors based on scores to add excitement and bring in more revenue to the provider and sponsors of the game. An alternate scoring method would require the item to be entered (e.g., through a voice command or the selection of a button, etc.) after the item was selected from a list. The entry activity would then preferably cause verification to proceed as in the automatic case. An alternative feature is to create a contest, such as the counting of occurrences of an event (e.g., a particular restaurant sign from start to destination for a free hamburger, number of times a song was on the radio for a discount at a record store). This counting could be verified with position and time data.

Another feature of the present disclosure includes making a "treasure hunt" where finding one item, reveals a puzzle for the next item. These could be made random within given travel parameters, or specific given a starting and end point. The game could be based on general parameters rather than a starting and destination location. Alternatively, the game could be played on a weekend as a road rally or scavenger hunt. Players who are children could compete while doing errands with parents. The parameters I targets could change based on location, time, or date. The game duration could be based on a set point total, a time limit, or a player definable gate. The game could be based on web based data bases, or self contained data bases. Revenue would come from businesses paying to be included in the game or web database. Additional revenue could be obtained by allowing larger points be assigned to sponsors that pay larger amounts. The more locations, the higher the price to sponsor.

Figure 1:
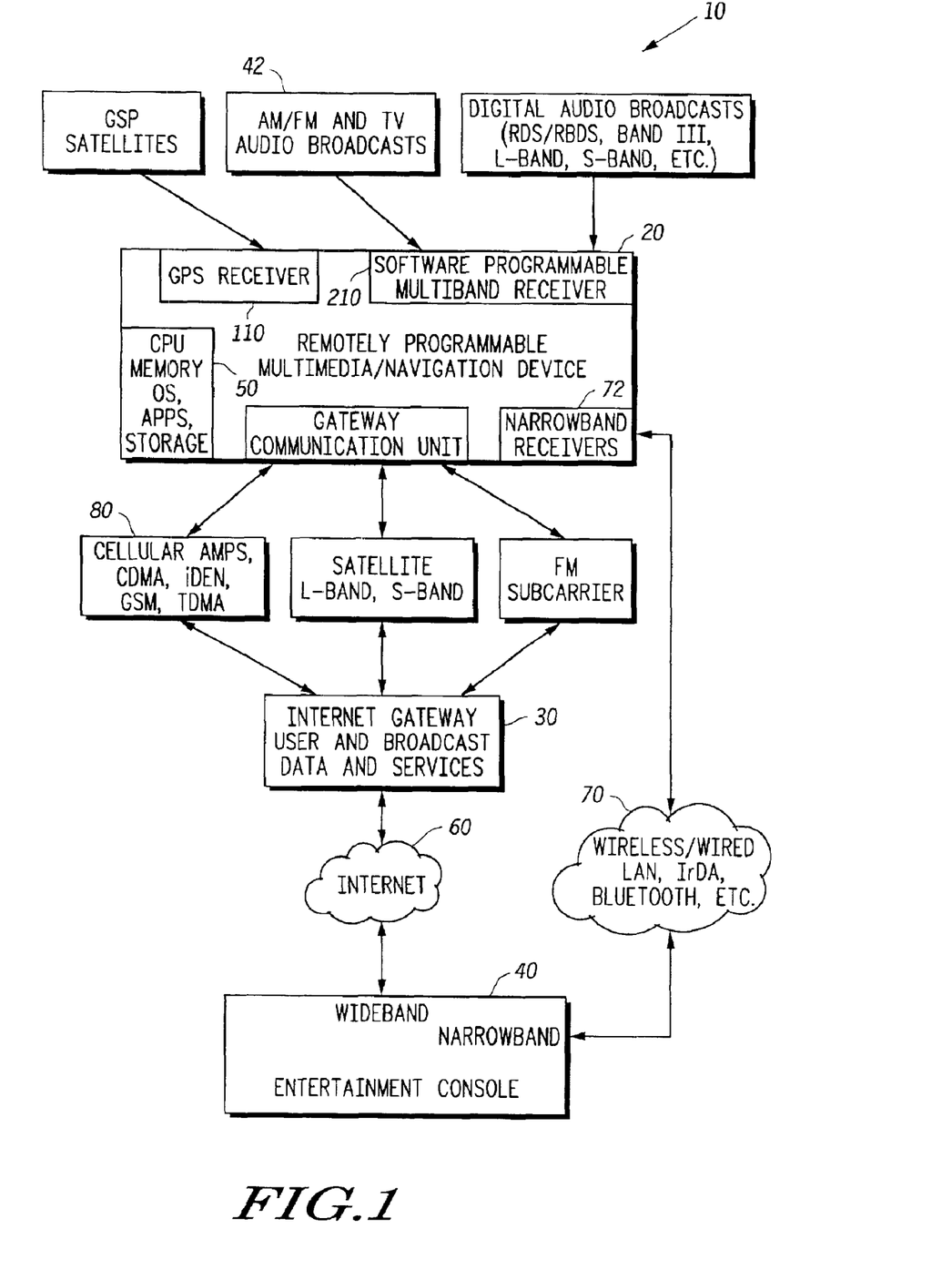
FIG. 1 is a block diagram of a system overview for providing entertainment to a vehicle.

Turning first to FIG. 1, where like elements receive like reference numerals throughout, a computer controlled multimedia entertainment and information system 10. enables enriched audio broadcasts, personalized information services, integrated access to personal and recorded data, enhanced navigation services and other software expandable services, such as providing games and other entertainment in a vehicle through the use of a wireless Internet connection to an enabling Internet gateway network. As shown in FIG. 1, a remotely programmable, microcomputer controlled multimedia device 20 in a vehicle with a wireless IP address for Internet access, an Internet gateway network 30 that provides programming, information and Internet access to the multimedia device 20, and one or more entertainment consoles 40. The entertainment console(s) 40 are preferably connected to the multimedia device 20 by way of communication network 70, which could either be a wired or wireless connection, such as a LAN, Irda, Bluetooth or other connection. Entertainment console 40 could also communicate with multimedia device 20 by way of internet 60. While such an entertainment console for performing the method of the present invention could find particular application in a vehicle, such methods disclosed in the present invention could be performed on a variety of devices, including portable devices, such as wireless communication devices.

The multimedia device 20 includes a computer 50 that preferably runs an operating system and series of applications that control the operation of the device 20. A user operates an application by tuning to a "channel" in keeping with the known radio paradigm and its user friendly operations. The two types of channels preferably available are audio broadcasts (e.g., AM, FM, TV, digital, Internet audio broadcasts and recorded material) and personal information services (e.g., navigation, email, traffic alerts, etc.). Channels are organized in a hierarchy 158 so any one can be easily selected on screen (see FIG. 2). Audio broadcast channels 42 are organized by the format of the broadcast (i.e., country, rock, talk, etc.) and not by the band or frequency of the station. The listener configures the organization of the channels through a remote device 40 via the Internet gateway network 30.

The Internet gateway network 30 is designed to transmit and receive critical information to and from a multimedia device 20 in the vehicle 184. Information transmitted preferably includes broadcaster identification that allows the multimedia device 20 to tune to stations by their formats, direct Internet access for streaming audio broadcasts and other Internet content, broadcast advertising database lookup for direct response to advertisements heard in a vehicle, navigation services, delayed digital personalized broadcasts, personal information event notices, and application downloads to create new personal information channels.

An entertainment console 40, such as a wireless communication device connected to the Internet 60, are used to download information from the Internet gateway network 30. Entertainment console 40 can also be used to provide software, such as games and information and/or data from the Internet gateway 30 to the multimedia device 20, and can retrieve information from the gateway 30 that he has stored there from the vehicle 184. In particular, wireless games or information and/or data for such games can be downloaded to a vehicle or a portable device according to the present invention. While FIG. 1 shows many possible wireless communication methods between the vehicle device and the gateway, as those skilled in the art will appreciate, the methods illustrated in FIG. 1 are meant to be representative and do not reflect all possible wireless communication methods that may be employed.

Figure 2:
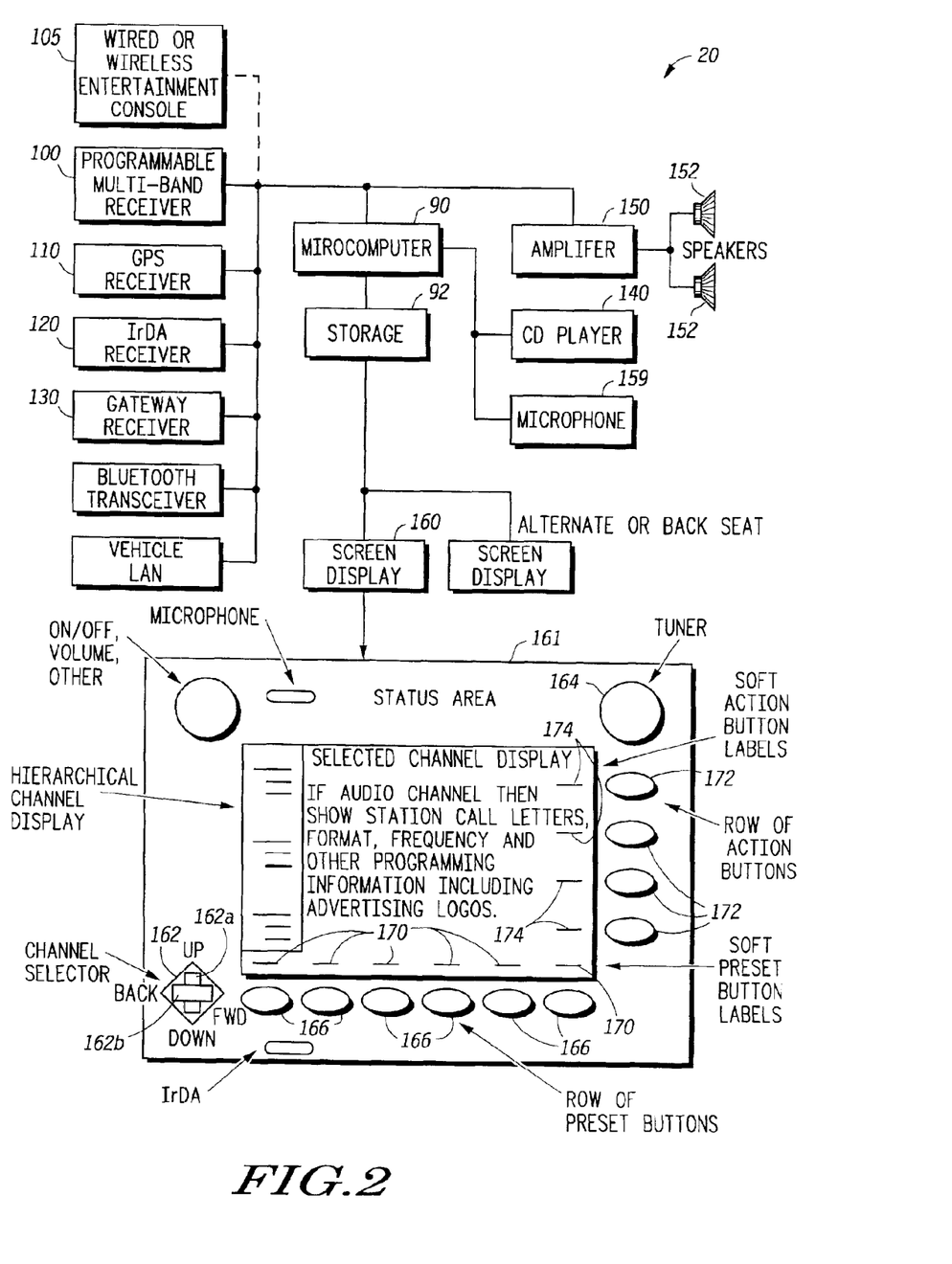
FIG. 2 is a block diagram of a vehicle multimedia receiver for providing entertainment in a vehicle.

Also according to FIGS. 1 and 2, the multimedia device 20 consists of computer 50 preferably having a microprocessor and memory 90, and storage devices 92 that contain and run an operating system and applications to control and communicate with four receivers, such as: a software controlled multi-band AM, FM, TV audio and digital audio broadcast receiver 100; a wired or wireless entertainment console 105; a geographical positioning device, such as a GPS receiver 110 that continuously reports the vehicle's longitude, latitude and altitude; one or more high-speed, narrow band wireless transceivers 120 for fast transmission and reception of large amounts of data from accommodated devices; and a wide band wired or wireless Internet addressable gateway transceiver 130 to receive Internet protocol based audio broadcasts, new applications known as information or data channels, and configuration data from a gateway network 30 created to service the multimedia devices 20. The in-vehicle wireless gateway transceiver 130 can also send information to the gateway network 30 such as requests for navigation data, advertisement responses, purchase requests, etc. The vehicle multimedia device of FIG. 2 also preferably includes a bluetooth transceiver 132 and a vehicle LAN 134. The multimedia device 20 also controls attached conventional multimedia storage equipment such as a CD/DVD player 140 or cassette player (not shown). Sound is output through an industry standard amplifier 150 and speakers 152. A microphone 154 allows for voice recognition commands to be given and received by the multimedia device 20. While GPS is cited as one type of geographical positioning device, any other means for determining position, including cellular ID, dead reckoning, delta position (vector) beacon, proximity detectors, etc. could be used.

The multimedia device 20 preferably also contains and controls one or more digital storage devices 92 to which real-time broadcasts can be digitally recorded. The storage devices 92 may be hard drives, flash disks, or other automotive grade storage media. The same storage devices 92 can also preferably store digital data that is wirelessly transferred to the vehicle in faster than real time mode. Examples of such digital materials are MP3 audio files or nationally syndicated radio shows that can be downloaded from the gateway network 30 and played back when desired rather than when originally broadcast.

As FIG. 2 shows, the multimedia device also uses a LCD, LED or similar suitable display screen 160 for an automotive environment to present information to the user and to control the multimedia device 20. Controls shown on the LCD in FIG. 2 are one possible embodiment for control types and location. Those skilled in the art will appreciate that control types and locations may vary in different implementations of the invention. In one presently preferred embodiment, for example, the display screen 160 includes a 5½ inch 640×480, 216 color VGA LCD display 168. In an alternate embodiment, the display can display as little as two lines of text, whereas an upper limit of the screen display 168 can be as large as the intended application may dictate.

The channel selector 162, tuner 164 and preset button 166 controls shown in FIG. 2 allow the user to broadly navigate all the channels of audio broadcasts and information services available on the multimedia device 20.

A microphone input 176 on the face of the display 160 allows users to control the multimedia device 20 verbally rather than through the control buttons. Key word recognition software allows the user to make the same channel selections that could be made from any of the button controls. Audio feedback through speech synthesis allows the user to make selections and hear if any other actions are required. Software or hardware based voice recognition and speech synthesis may be used to implement this feature.

Figure 3:
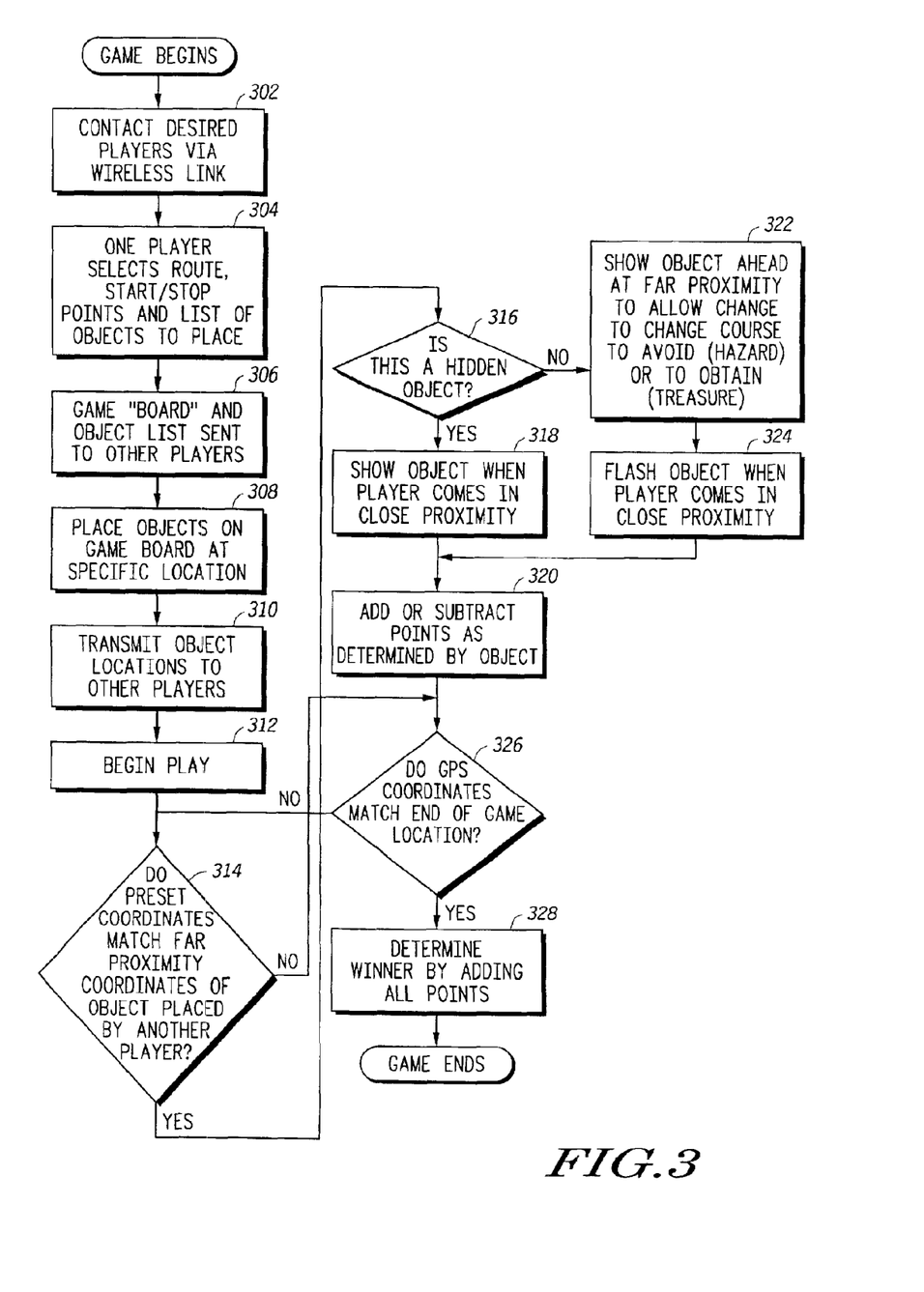
FIG. 3 is a flow chart showing a method for providing entertainment in a vehicle according to a first embodiment of the invention.

Turning now to FIG. 3, a flow chart shows a method for providing entertainment to a vehicle according to one embodiment of the present invention. The desired players are preferably contacted via a wireless link at a step 302. One player preferably selects a route, start and stop points and a list of objects to place on the route at a step 304. A game "board" and an object list are sent to other players at a step 306. The players place objects on the game board at specific locations at a step 308. The location of the objects is transmitted to other players at a step 310, and play begins at a step 312. It is then determined at a step 314 whether the present coordinates match predetermined coordinates of objects placed by another player. If the coordinates do match, it is determined if the object is a hidden object at a step 316. If it is a hidden object, the object will be shown when a player comes within a close proximity to the object at a step 318. Points are added or subtracted, depending upon the object at a step 320. If the object is not a hidden object, the object is shown ahead at a distance to allow a player to change course to avoid a hazard or obtain a treasure at a step 322. Preferably, a notification that the object is found is provided when a player comes within a close proximity to the object at a step 324. It is then determined if GPS coordinates match the end of the game location at a step 326. If the coordinates do not match the end of game location, the present coordinates are again checked at step 314. If the coordinates do match, a winner is determined by adding all the points at a step 328.

Figure 4:
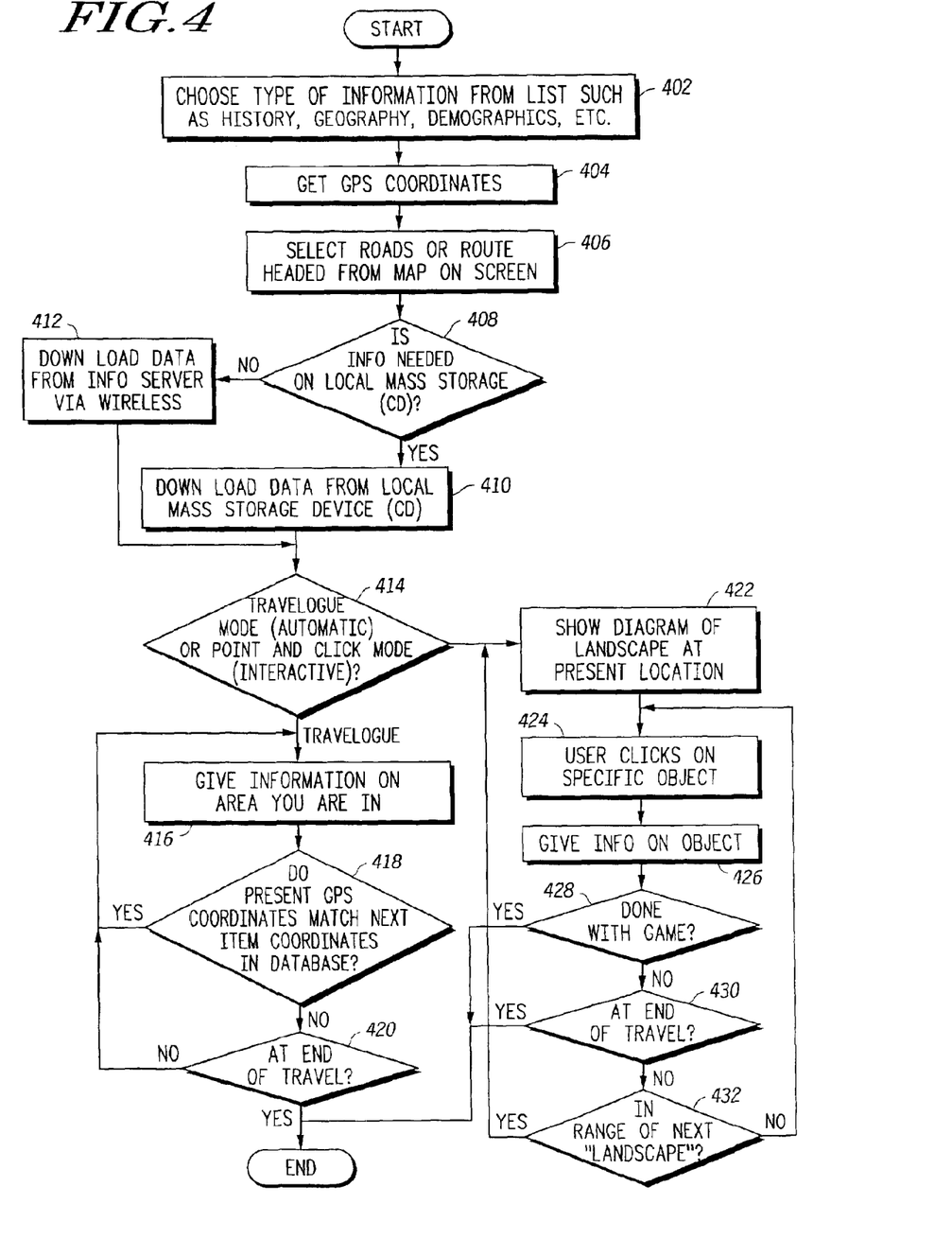
FIG. 4 is a flow chart showing a method for providing entertainment in a vehicle according to an alternate embodiment of the invention.

Turning now to FIG. 4, an alternate embodiment for providing entertainment according to the present invention is shown. A specific type of information is chosen from a list of available information at a step 402. The GPS coordinates are obtained at a step 404. The road or route is preferably selected from a map on the screen at a step 406, although the route could be entered in a number of ways. Various zoom levels of the map can be presented to select a start or stop point from a travel log. Alternately, rather than a deterministic selection of the route by the user, the user can also select a mode to give information whenever he drives or the system can provide a predetermined route such as a tour. It is then determined whether the information is needed on a local mass storage device, such as a CD, at a step 408. If information is needed from the mass storage device, data is down loaded from the mass storage device at a step 410. Alternatively, data is down loaded from an information server via wireless communication network at a step 412. It is then determined whether the travel log mode (automatic) or point and click mode (interactive) is selected at a step 414. If a travel log mode is selected, the user is provided information regarding the area at a step 416. It is then determined whether the present GPS co-ordinates match the next item co-ordinates in the database at a step 418. If they do not match, it is determined whether the user is at the end of the travel at a step 420.

If the user is in the click mode at step 414, a diagram showing the landscape of the present location is shown at a step 422. The user clicks on a specific object at a step 424, and information regarding the object is given at a step 426. It is then determined whether the user is done with the game at a step 428. If the user is not done, it is then determined whether the user is at the end of the travel at a step 430. If the user is not at the end of the travel, it is then determined whether the user is within range of the next landscape at a step 432. If the user is within range of the landscape, a diagram showing the landscape is again shown at step 422. If the user is not within range, the user may still click on a specific object at step 424.

Figure 5A:
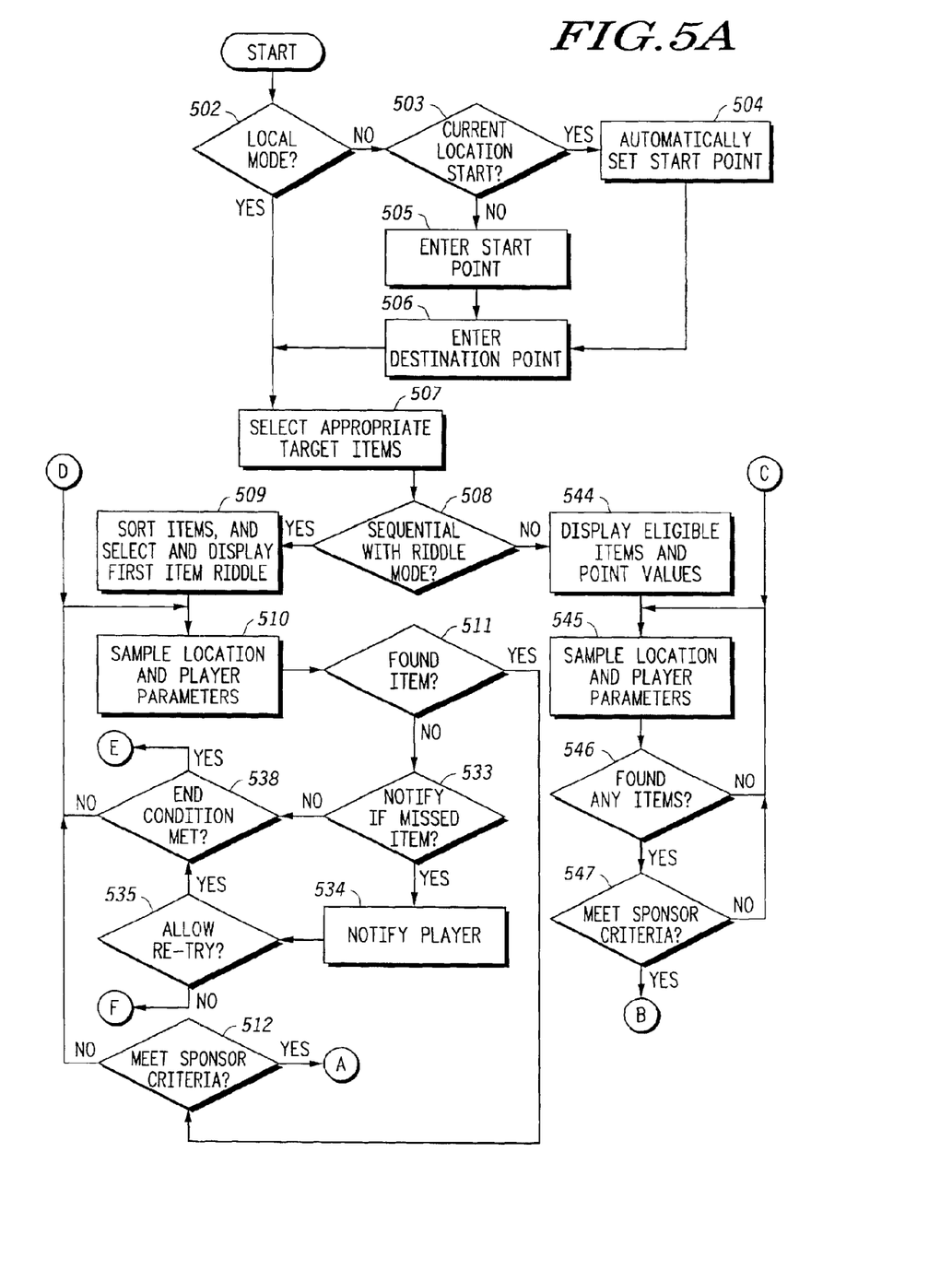
FIG. 5 is a flow chart showing a method for providing entertainment in a vehicle according to an alternate embodiment of the invention.
Figure 5B:
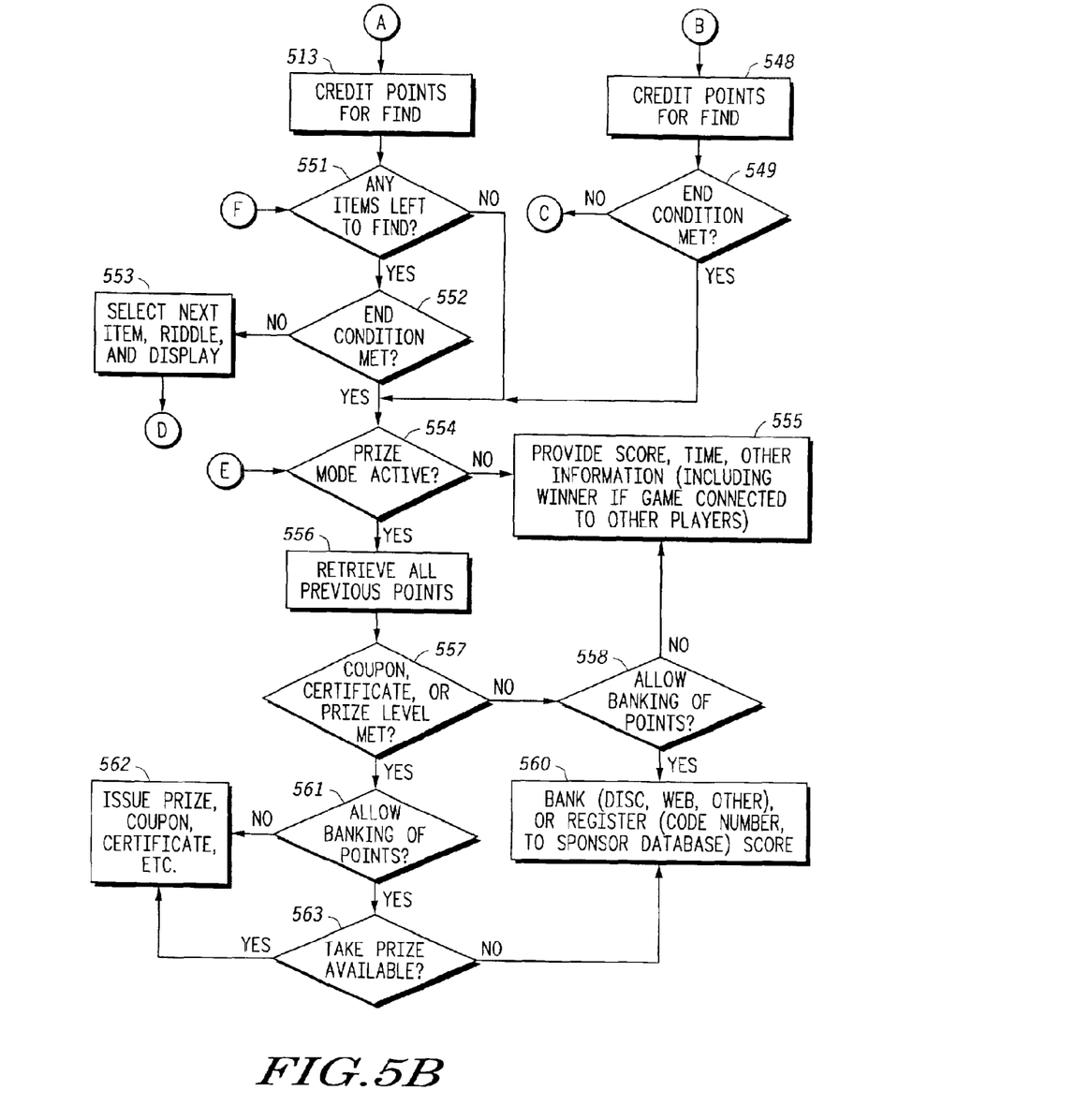

Referring to FIG. 5, an alternate embodiment for providing entertainment in a vehicle is shown. It is determined at a step 502 if the user will activate a predetermined game for a specified area, or use a free form version of a game over a broader or random area. In determining if the current location is the start at step 503, the information could be entered by using the current location as a default at a step 504, or entering a different location at a step 505. The entering could be done through a wireless device, a keypad on a PDA, or though a web page or similar interface. Similarly the destination could also be entered at a step 506. Note that the end point could be a journey end, a midpoint (so the user is not interrupted after a certain point), or it could be returning to the current location. If decision for a limited, or local, version is chosen at step 502, then the starting information is automatically entered. The final action in the set up of the game is to select the appropriate items for the game at a step 507. The parameters of the game could be based on a wide variety of questions which could be presented to the player, including but not limited to such questions as: is this game a single company sponsored game (e.g., a particular restaurant provided this game), what is the current date (some promotions will have a specified time limit, or only valid during certain seasons), what is the current time (some business partners may only be interested in being a sponsor at certain times e.g., restaurants emphasizing at meal times, or hotels emphasizing evening), what is the current location of the vehicle (e.g., hotels more interested when player is away from home area)? Alternatively, the parameters could be provided based upon the status of the vehicle.

The type of game to play is then determined at a step 508 by determining whether the game requires a sequential location or time requirement. This type of game is similar to a road rally, mystery, treasure hunt, song identifier, etc. The other type requires finding in any order a set of items that is presented to the user by wireless, PDA, fax, list on paper, or other method. This type of game is similar to highway bingo, scavenger hunt, count the number of a specified item(s) along a route, etc.

If the game is to be a sequential type, the items to be found are sorted at a step 509 based on a specified route, based on a route created to meet the start and end points, or a route is created with relatively random start and end points (within a reasonable distance at the start and end points to the current location). Such a route could either be defined by player or sponsoring company. The event would preferably end at a sponsor location (particularly if the player can claim a prize, discount, or other reward). After the items are selected, the first item to be found is presented to the player. It is important to note that the presentation needs to be flexible. If played in a vehicle, the driver needs to be aware of the road and traffic, so voice or other methods need to be used to provide the information. The item could be presented as an explicit item (e.g., song on a station, a business location, etc.), or presented in a riddle or clever manner. The player/user then begins to move towards the probable location, or travels their route aware of the item to be found. The game hardware and software begin sampling the player location, time, and other parameters that may be available at a step 510.

When a player satisfies a set of conditions that the item should have been found at a step 511, it is determined whether the player has met certain sponsor criteria at a step 512. For example, an activity may be required to claim credit, such as coming within a certain distance of the item (allows user to see the facility of the sponsor or another sponsor establishment), stopping at a location for a certain amount of time (to provide time to check menus, read daily specials, get a verifying piece of information, or read an educational marker), mark location on a paper map, electronically register a location, tag a song (if have radio and time information), etc. The verification information could be stored on paper, locally stored electronically, stored at a centralized location, or stored at a sponsor site. The method of providing the electronic information could be wireless, downloaded through a wired connection, or entered by player.

Once the criteria is met, the player obtains credit for the find at a step 513. The value of the find is influenced by many factors set by the vendor. These could include time of day, date, amount of time spent at location (overnight at hotel worth more than drive through), loading at the vendor (light loading contact worth more than contact when vendor is at capacity), etc.

If the item has not been found at step 511, and if the game allows notification of missing items at a step 533, the game will notify the player at a step 534 that a miss occurred. The game will then determine if the game allows multiple attempts at a step 535. If multiple attempts are allowed after notification, the test for end game conditions are tested at a step 538. If the end condition has not occurred, the find loop continues at a step 510. If the end condition has been met, the game enters the end sequence at step 554 which is described later. If no second chance is given at a step 533, it is determined whether the next item is found at step 551. If no notification is given, the game tests for end of game criteria (time, distance, misses, etc.) at step 538. If the end condition has not occurred, the find loop continues at step 510. If the end condition has been met, the game enters the end sequence at step 554.

Moving back to step 508, if the game should not be sequential, the game would provide a list of eligible items or conditions (e.g., count the number of advertisements between locations, or count the number of songs by a certain entertainer during the activity period, etc.) at a step 544. The list could be presented to the user by a wireless network, PDA, fax, list on paper, or other method. The player then begins to move towards the probable location, or travels their route aware of the item to be found. The game hardware and software begin sampling the player location, time, and other parameters that may be available at a step 545. When a player satisfies a set of conditions that the item should have been found at a step 546, it is then determined whether the player has met required sponsor criteria at a step 547. Once the criteria is met the player moves to getting credit for the find at a step 548. The value of the find is influenced by many factors set by the vendor. These could include time of day, date, amount of time spent at location (overnight at hotel worth more than drive through), loading at the vendor (light loading contact worth more than contact when vendor is at capacity), etc. The game then determines if end conditions have been met in 549. If the game limiting criteria are not met, the cycle continues at step 545. If the end condition is met, then move to box 554 as described previously.

Turning back to step 513, after crediting points for a find, it is then determined if there are other items to be found at step 551. If there are items to find, a test for end conditions being met is first completed at a step 552. If the game ending criteria are not met, a new item to find is presented to the player at a step 553, and the cycle continues at step 510. If the game ending criteria are met, then the game checks for the prize mode set by the vendor (and potentially other players if a multi-player challenge was being used) at a step 554. If no prize mode is active, the results are provided to the player at a step 555. If multiple players were involved, the final scores and rankings could be determined wirelessly, through wired methods, or visual comparisons. If prizes were active, the game combines all previous points that are available at a step 556. This combining could be done wirelessly, wired, or on paper. The game checks for the availability of a prize (coupon certificate, discount, trophy, or other recognition for achieving a score level) for the point total at a step 557.

If no reward is warranted, the game determines if the points earned are bankable for future prizes at a step 558. If they are not bankable, the results are printed at a step 555 as described above. If the points are bankable, the game will bank them for the future at a step 560. As mentioned earlier, the banking of points could be in one of many locations and forms (on paper, locally stored electronically, stored at a centralized location, or stored at a sponsor site). If a prize level is met, the game determines if points are bankable for a larger prize at a step 561. If they are not bankable, the prize or certificate is awarded at a step 562. If they are bankable, the game determines if the player wants the offered prize, or wants to bank for a larger prize/recognition at a step 563. If the offered prize is chosen, then the award is given at a step 562. If banking is chosen, they are banked for the future at step 560. Note that the sponsor(s) of the game can set limits to banking, and the duration/expiration of points.

Figure 6:
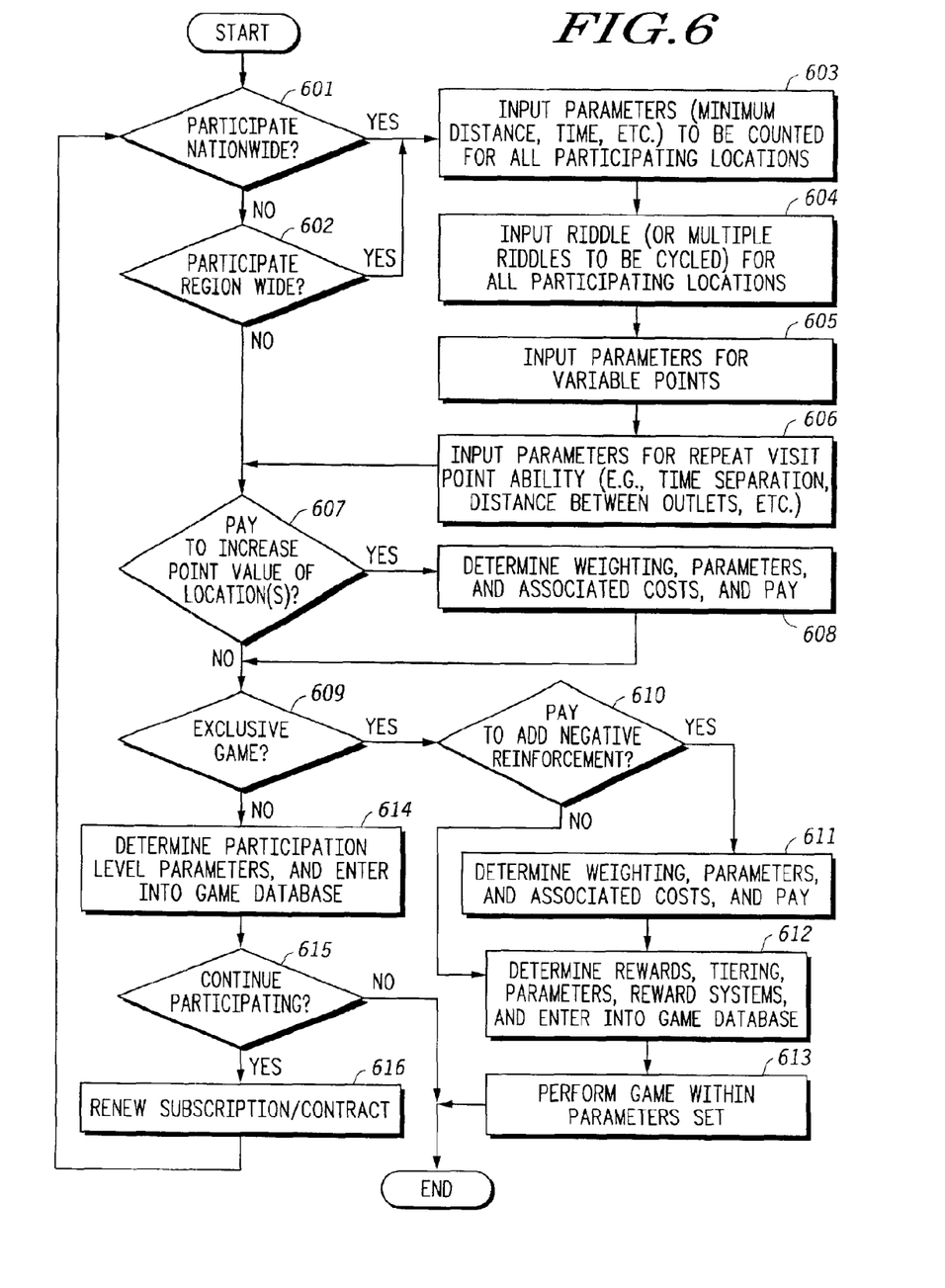
FIG. 6 is a flow chart showing a method for providing entertainment in a vehicle according to an alternate embodiment of the invention.

Turning now to FIG. 6, the vendor participation flow is described. The vendor decides if they want to participate nationwide at a step 601. This would apply to larger companies or companies that want to keep mindshare of their products in the minds of participants in the game (theme parks, restaurant chains, theatres etc.). If the vendor does not want to participate nationwide, it is then determined if the vendor wants to participate on a regional basis at a step 602. If the vendor wants to participate at a national or regional level, limiting geographic restrictions are provided to the game/service creator at a step 602. The parameters for the game are then entered at a step 604. These include, but are not limited to; locations to be added to data base, questions for sequential if desired, answer to contest parameters for routes (or location of items in areas and the provider of the game to determine correct answers based on player route traveled), activity requirements, radius for counting, time wait requirements, verifying information from signs or menus, amount of time between visits, amount of distance between outlets to count as unique visits, lockout of multiple counts on some location, etc. The vendor then supplies parameters for variable points (time windows, duration windows, additional activities required, repeat visits, determinate variable point parameters, etc. at a step 605. The input parameters for a repeat visit are then provided at a step 606 to create a minimum time separation or distance between visits.

It is then determined if the vendor wants to pay extra to have fixed parameter based dynamic scoring at a step 607. If yes, the weighting and parameters (e.g., capacity load, days sales, etc.), and point increases are determined and provided at a step 608. The vendor determines if this is to be an exclusive game to them, or to participate in a broad game with other vendors at a step 609. The decision factors include the ability to control prize factors and brand loyalty versus the distributing of costs for providing points. If the decision is to be exclusive, the option to add negative reinforcement is presented at a step 610. The negative reinforcement could be stopping at a competitor's location during your game. If yes, the vendor adds the factors for the dis-incentive (locations, dates, times, duration, etc.) at a step 611. Even if the vendor does not want negative reinforcement, the vendor determines how to distribute the game and the reward/prize system at a step 612. After these decisions have been set, the game is presented to players/customers at a step 613, and the game runs it course.

If the sponsor chooses not to be unique, and participate with other vendors at a step 609, the point levels and support need to be determined at a step 614. The vendor then participates for as long as they continue to pay the subscription fee, as determined at a step 615. If the vendor wants to continue, they renew the agreement at a step 616, and start over at 601.

In summary, a unique method for providing entertainment to a wireless communication device is disclosed. The method includes steps of receiving location information related to said wireless communication device; providing challenges associated with a game to a user of a wireless communication; providing rewards in response to answers based upon the location of said wireless communication device. The method finds particular application in vehicles having telematics communications products. While particular embodiments are disclosed, it will be understood that the invention is not limited by such embodiments, but could include all variations within the spirit and scope of the invention as set forth in the following claims.

We claim:

1. A method for providing entertainment to a portable device, said method including the steps of:

defining a navigational game with desired locations and undesired locations along a navigation route by a sponsor of the game;

receiving location information related to said portable device;

providing challenges associated with the sponsor of the game to a user of a wireless communication;

scoring positive and negative points associated with the respective desired and undesired locations in response to the location of said portable device; and awarding sponsor-related incentives to the user in accordance with the total points from the scoring step.

2. The method of claim 1 wherein said game is downloaded to multiple devices in multiple vehicles such that the multiple vehicles can play the game against each other.

3. The method of claim 1 wherein the awarding step includes awarding discounts relating to at least one of a sponsor's products and services.

4. The method of claim 1 wherein an endpoint of the game includes a sponsor location.

5. The method of claim 1 wherein said defining step includes setting a prize mode, and wherein the awarding step includes checking the prize mode setting.

6. The method of claim 1 wherein said points from the scoring step are bankable.

7. The method of claim 1 wherein said providing step includes revealing a challenge for a next location in the game related to solving the challenge for the current location of the game.

8. The method of claim 1 wherein the defining step includes a plurality of sponsors having desired locations and undesired locations wherein different points are associated with different sponsor locations.

9. The method of claim 1 wherein the defining step includes a player of the game defining their own locations for use by other players.

10. The method of claim 3 wherein the discounts have time limits.

11. A method for providing entertainment to a portable device, said method including the steps of:

providing a wireless communication system in a vehicle, said wireless communication system communicating with a wireless communication device;

defining a navigational game with desired locations and undesired locations along a navigation route by a sponsor of the game;

receiving location information related to said wireless communication device;

providing challenges associated with the sponsor of the game to a user of a wireless communication from a remote network by way of said wireless communication system;

scoring positive and negative points associated with respective desired and undesired locations in response to the location of said wireless communication device; and awarding sponsor-related incentives to the user in accordance with the total points from the scoring step.

12. The method of claim 11 wherein said game is downloaded to multiple wireless communication devices in multiple vehicles such that the multiple vehicles can play the game against each other.

13. The method of claim 11 wherein the awarding step includes awarding time-limited discounts relating to at least on of a sponsor's products and services.

14. The method of claim 11 wherein an endpoint of the game includes a sponsor location.

15. The method of claim 11 wherein said defining step includes setting a prize mode, and wherein the awarding step includes checking the prize mode setting.

16. The method of claim 11 wherein said points from the scoring step are bankable.

17. The method of claim 11 wherein said providing step includes revealing a challenge for a next location in the game related to solving the challenge for the current location of the game.

18. The method of claim 11 wherein the defining step includes a plurality of sponsors having desired locations and undesired locations wherein different points are associated with different sponsor locations.

19. The method of claim 11 the defining step includes a player of the game defining their own locations for use by other players.

20. A method for providing entertainment to a wireless communication system, said method including the steps of:

providing a wireless communication system in a vehicle, said wireless communication system communicating with an entertainment counsel in said vehicle;

defining a navigational game with desired locations and undesired locations along a navigation route by a sponsor of the game;

receiving location information related to said vehicle;

providing challenges associated with the sponsor of the game to a user of said entertainment counsel from a remote network by way of said wireless communication system;

scoring positive and negative points associated with the respective desired and undesired locations in response to the location of said vehicle; and awarding sponsor-related incentives to the user in accordance with the total points from the scoring step.

* * * * *